United States Patent [19]

Nakagawa et al.

[11] Patent Number: 4,736,252

[45] Date of Patent: Apr. 5, 1988

[54] MOTION DETECTOR FOR CHROMINANCE SIGNAL IN TV RECEIVER

[75] Inventors: Isao Nakagawa, Yokohama; Masahiko Achiha, Iruma; Masato Sugiyama, Yokohama; Kenji Katsumata, Yokohama; Toshinori Murata, Yokohama; Shigeru Hirahata, Yokohama; Akihide Okuda, Yokohama, all of Japan

[73] Assignee: Hitachi, Ltd., Tokyo, Japan

[21] Appl. No.: 932,376

[22] Filed: Nov. 20, 1986

[30] Foreign Application Priority Data

Nov. 22, 1985 [JP] Japan .................. 60-261036

[51] Int. Cl.[4] ............................................. H04J 9/64
[52] U.S. Cl. ................................... 358/105; 358/21 R
[58] Field of Search ................ 358/105, 21 R, 31, 36, 358/37, 23

[56] References Cited

U.S. PATENT DOCUMENTS

| 4,556,900 | 12/1985 | Willis | 358/23 |
| 4,626,891 | 12/1986 | Achiha | 358/105 X |
| 4,639,767 | 1/1987 | Suzuki | 358/105 X |
| 4,641,120 | 2/1987 | Richter | 358/105 X |

FOREIGN PATENT DOCUMENTS 0115995  9/1983  Japan .

OTHER PUBLICATIONS

"A Motion-Adaptive High-Definition Converter for NTSC Color Signals", Achida et al., SMPTE Journal, May 1984, pp. 470–476.

Primary Examiner—Howard W. Britton
Assistant Examiner—Victor R. Kostak
Attorney, Agent, or Firm—Antonelli, Terry & Wands

[57] ABSTRACT

A motion detector for a chrominance signal which is used with a TV receiver equipped with a video signal motion detector. This motion detector for a chrominance signal has a delay element for delaying the chrominance signal of a video signal by 1 frame period, a subtractor for subtracting the output signal of the delay element from the input signal thereof, an absolute value conversion circuit to which the output signal from the subtractor is inputted, and a smoother circuit to which the output signal from the absolute value conversion circuit is supplied. If the chrominance signals of video signals on two consecutive frames are the same, the output signal of the subtractor becomes zero. If the chrominance signals of video signals on two consecutive frames are different, the output signal of the subtractor takes a positive or negative value. The negative value signal is converted into a positive value signal by the absolute value conversion circuit. A signal is outputted from the smoother circuit only when the chrominance signals of video signals on two consecutive frames are different. This outputted signal is a chrominance signal motion detection signal. The luminance signal contained in a video signal is removed from the video signal using a comb-type filter.

10 Claims, 13 Drawing Sheets

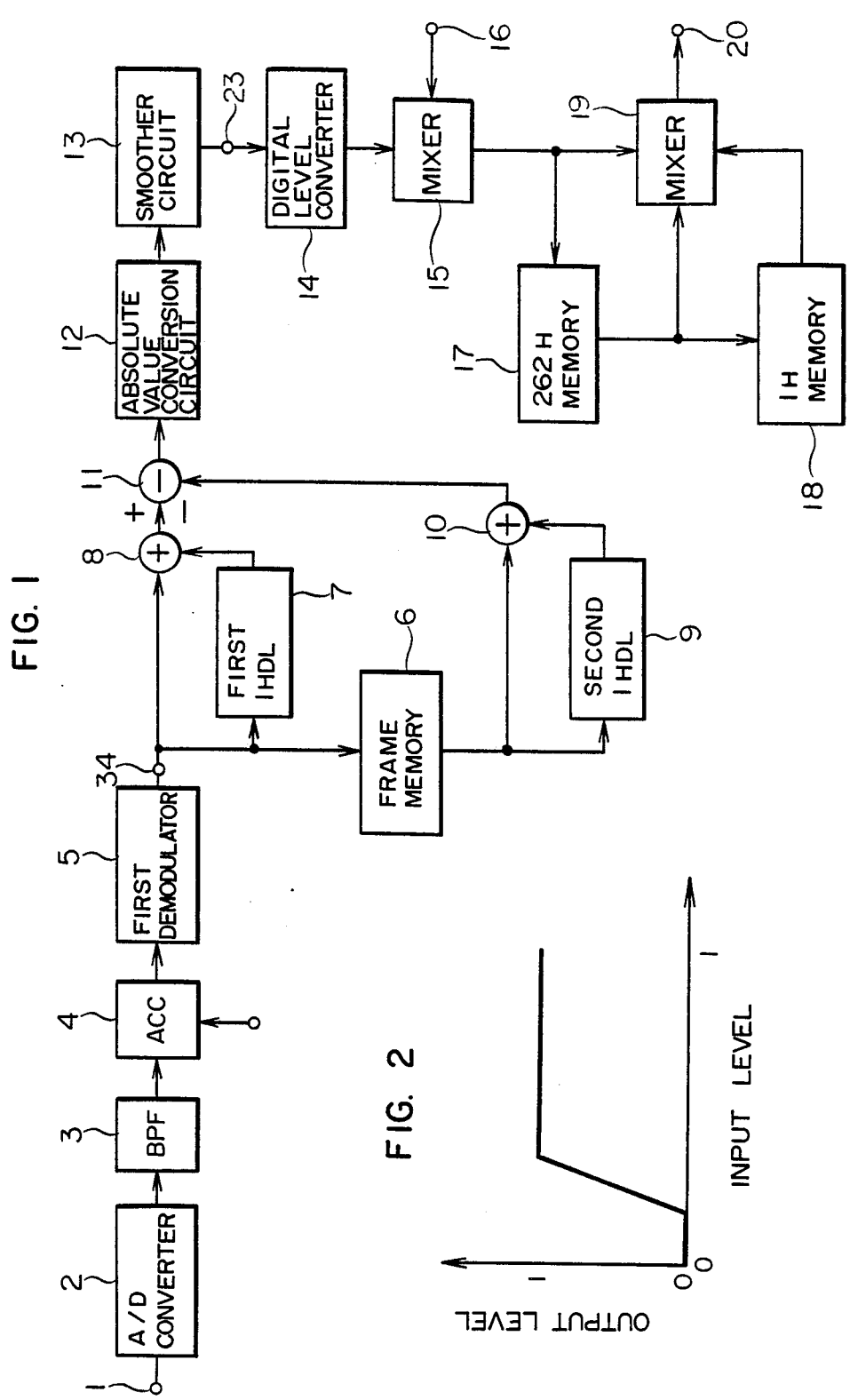

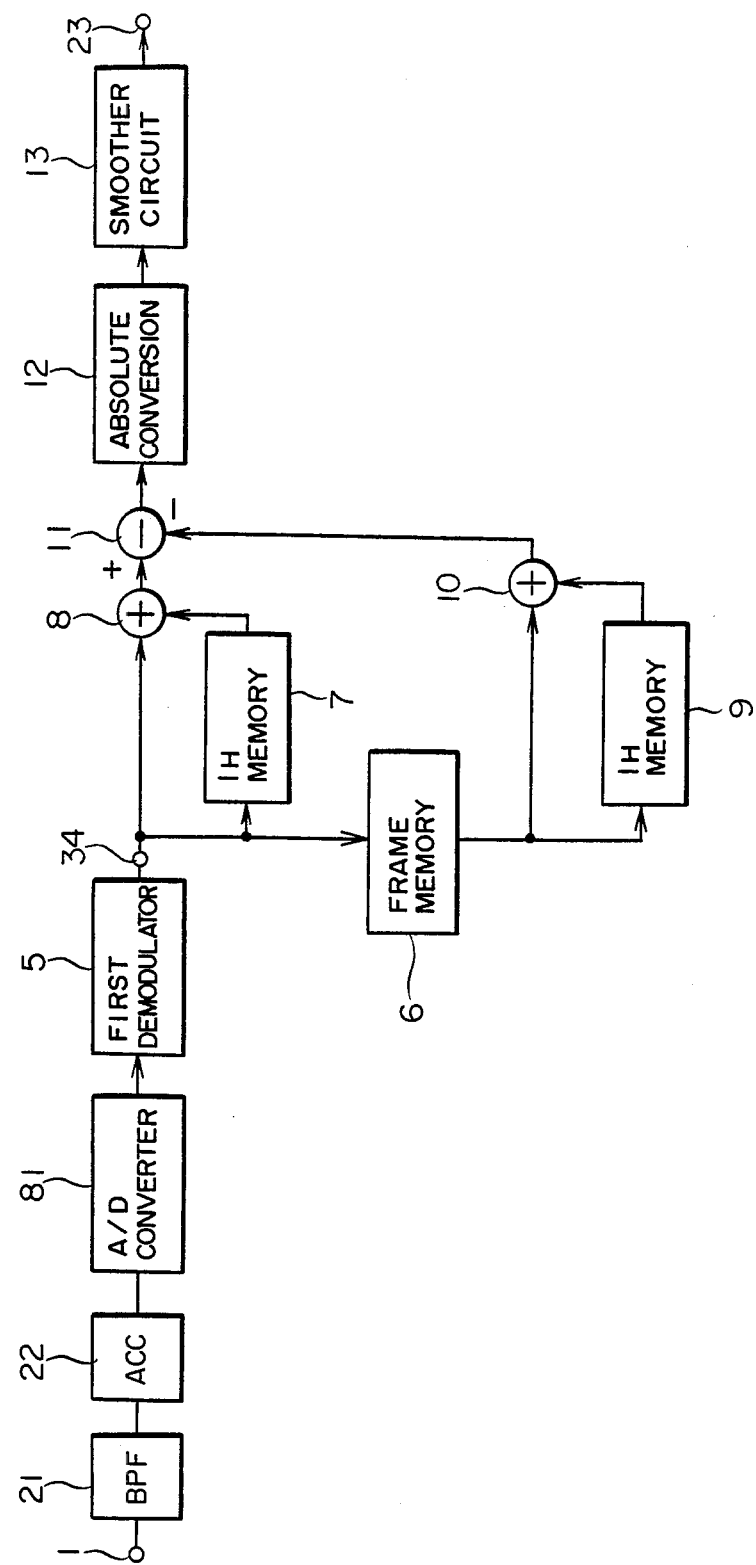

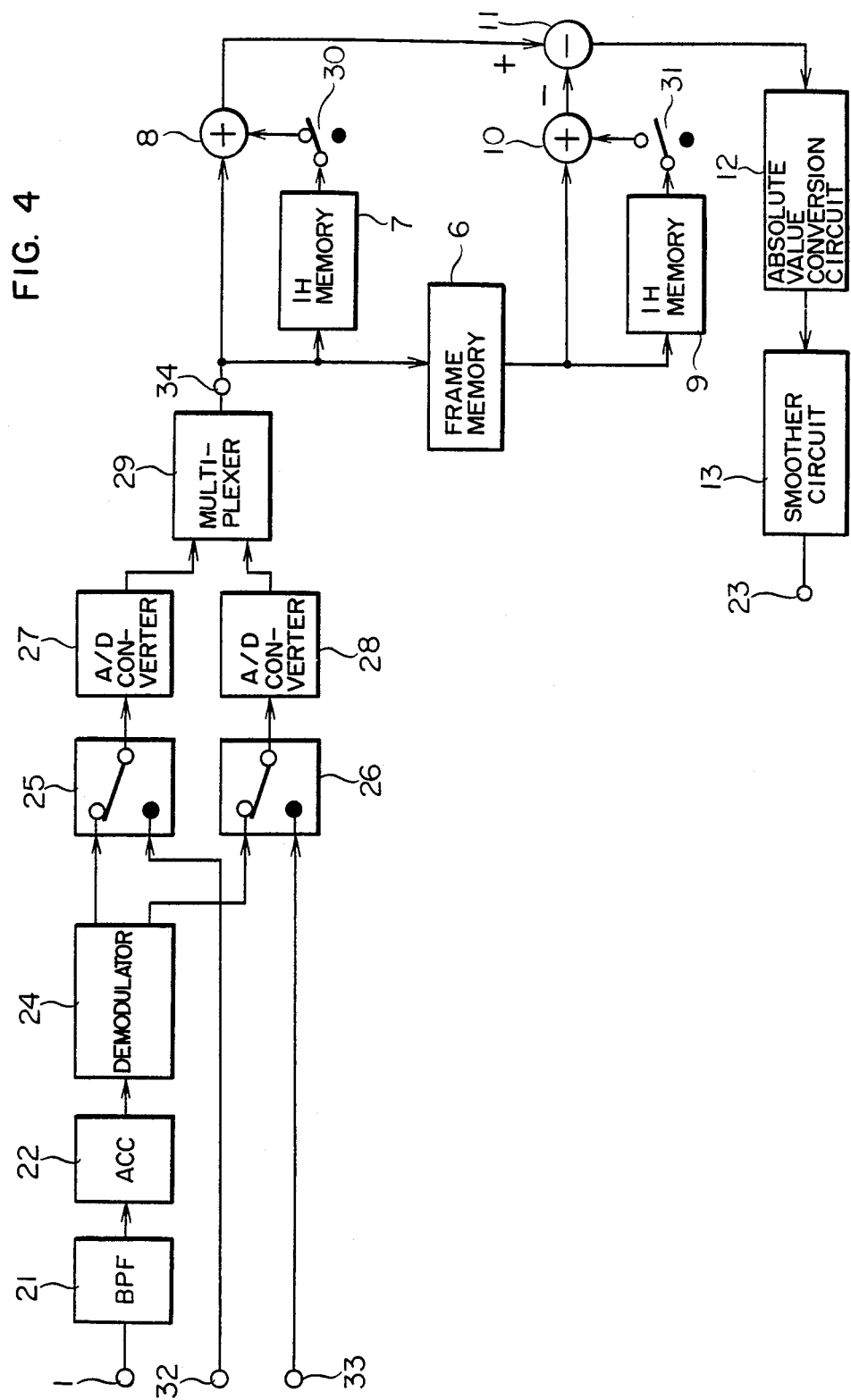

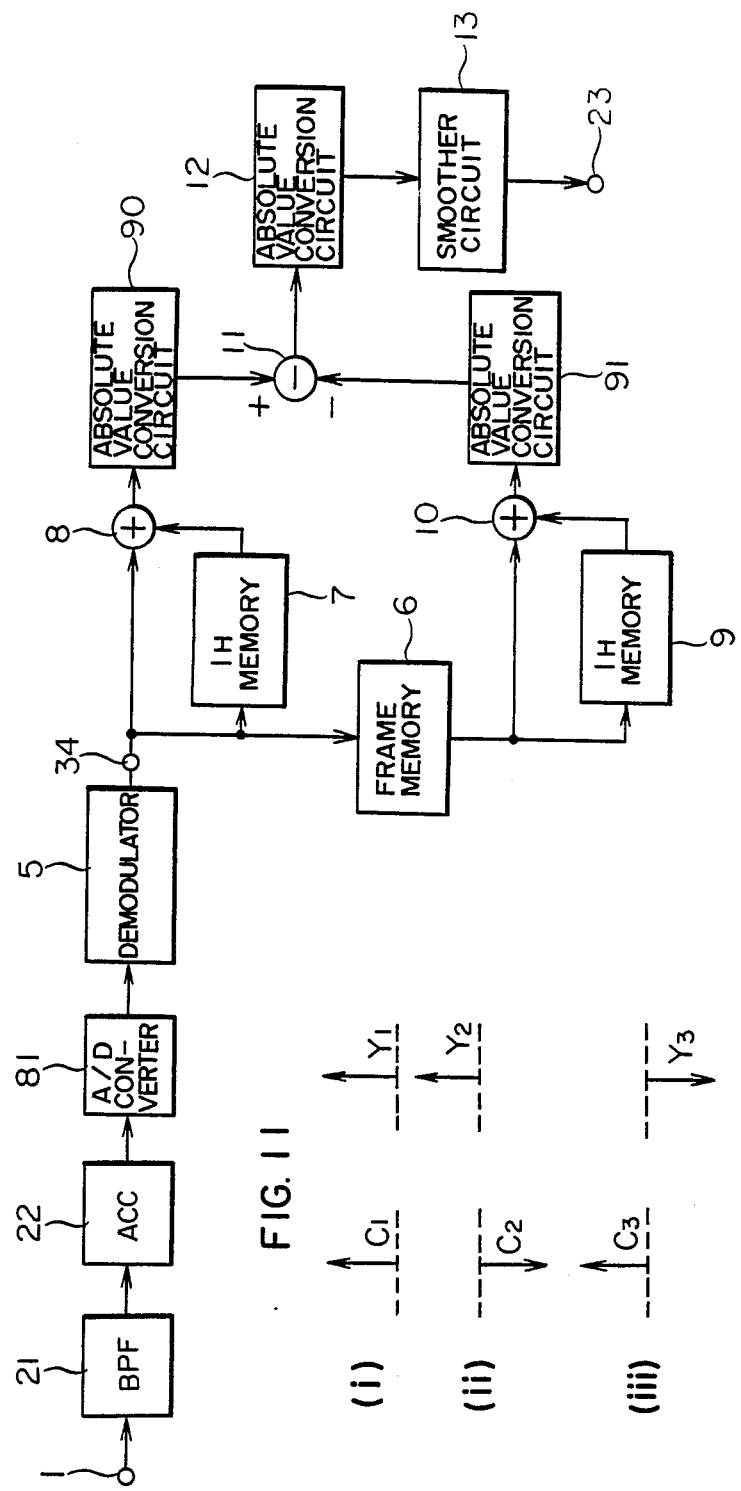

MOTION DETECTOR FOR CHROMINANCE SIGNAL IN TV RECEIVER

BACKGROUND OF THE INVENTION

The present invention relates to a video signal detector for use with a color television receiver wherein an image signal motion between two consecutive frames is detected, and more particularly to a motion detector suitable for detecting the change (motion) of chrominance signal components of an image using a composite color television signal.

In an NTSC system television receiver, the phase of a chrominance sub-carrier is inverted between 1st and 2nd consecutive frames when a video signal of a still image is received. If a composite video signal of a 1st frame delayed by one frame period is added to a composite video signal of a 2nd frame, the chrominance sub-carriers of the 1st and 2nd frames are cancelled out so that a luminance signal can be obtained. If a composite video signal delayed by one frame period is subtracted from a composite video signal of a 2nd frame, a luminance signal is removed and a chrominance signal can be separated. In this manner, in the case of a video signal of a still image, cross-components such as cross-color, cross-luminance, i.e., hanging dots are substantially eliminated to enable a high image quality of display on a television receiver. However, there is no corelation between 1st and 2nd frame video signals of a motion image. Therefore, if such processing of composite video signals between frames is performed when a television receiver receives video signals of a moving image, cross-components contained in the luminance signal or the chrominance signal increase. As a result, the quality of an image reproduced on a picture tube deteriorates. In view of this, if there is any motion in an image, the processing of video signals between frames is suspended, and instead in-field processing of video signals is requested, such as processing of video signals between lines. To this end, a detector for detecting motion in an image is needed. A conventional detector is described in JP-A- No. 58-115995.

This detector, however, does not take into consideration a motion detection of video signals whose luminance signal levels do not change between two frames but hues and saturations differ between two frames, namely a detection of video signals having a motion in chrominance. Thus, this detector has a low sensitivity of detecting a motion in chrominance, resulting in large hanging dots over the whole image area having a chrominance motion.

SUMMARY OF THE INVENTION

An object of the present invention is to provide a motion detector for use with a TV receiver capable of detecting a chrominance motion precisely and eliminating a cross-luminance obstacle (hanging dots) appearing on a reproduced image of a picture tube.

According to the present invention, a difference between chrominance signals $C_n$, $C_{n+1}$ of video signals on two consecutive frames is detected. In other words, a difference between is detected chrominance signals of video signals each differing by one frame period. To generate video signals differing by one frame, a frame memory (one frame delay device) is used to which a chrominance signal $C_n$ is supplied. At the output of the frame memory, a chrominance signal $C_{n(d)}$ is obtained. A subtracter is used for calculating a difference between the chrominance signal $C_{n+1}$ and the chrominance signal $C_{n(d)}$, and therefore it is supplied with the signals $C_{n+1}$ and $C_{n(d)}$. If the chrominance signals $C_n$, $C_{n+1}$ are the same, then the chrominance signals $C_{n+1}$, $c_{n(d)}$ are the same so that the output of the subtracter becomes zero. In case of zero output of the subtracter, chrominance signals between two frames do not change and there is no motion in chrominance. Otherwise, chrominance signals between two frames change and there is a chrominance motion. The output signal of the subtracter is inputted to an absolute value circuit where a negative output signal is converted into a positive signal. The output signal of the absolute value circuit is inputted to a smoother circuit of which the output signal is a detection signal indicative of a change of chrominance signals of video signals between two consecutive frames, i.e., a detection signal indicative of a chrominance motion. This detection signal is used, for example, together with a signal detecting a luminance motion of video signals, for detecting a motion of an image. A luminance signal contained in a video signal is removed therefrom by a vertical correlation circuit (comb-type filter) using a one horizontal period delay line.

BRIEF DESCRIPTION OF THE DRAWINGS

FIG. 1 is a block diagram showing a first embodiment of a motion detector according to the present invention.

FIG. 2 shows a characteristic curve illustrating a conversion performance of a signal level converter.

FIG. 3 is a block diagram showing a second embodiment of a motion detector according to the present invention.

FIG. 4 is a block diagram showing a third embodiment of a motion detector according to the present invention.

FIG. 11 diagrammatically shows the phases of chrominance signals and luminance signals.

FIG. 12 is a block diagram showing a ninth embodiment of a motion detector according to the present invention.

DESCRIPTION OF THE PREFERRED EMBODIMENTS

Figure 5:
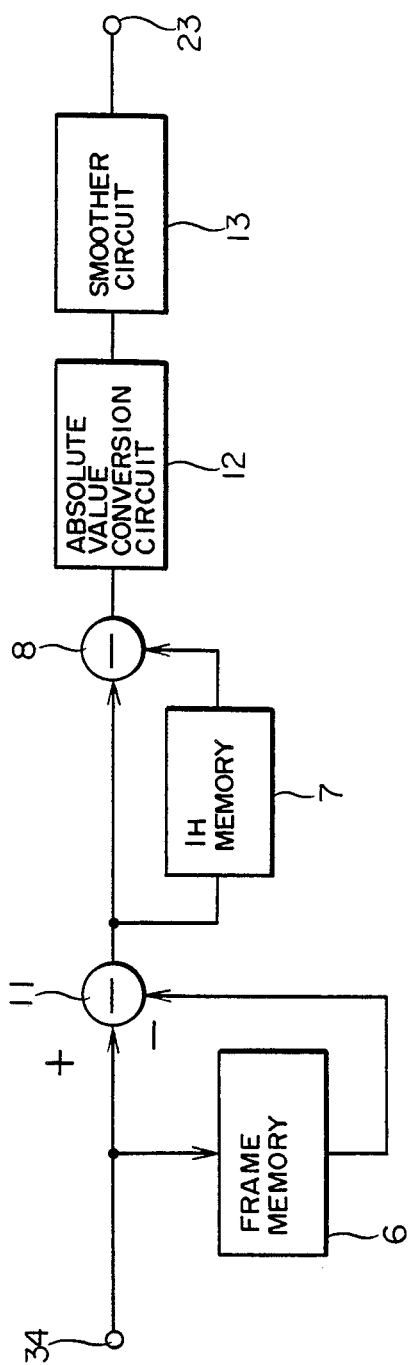
FIG. 5 is a block diagram showing a fourth embodiment of a motion detector according to the present invention.

A first embodiment of the present invention is shown in FIG. 1. An analog composite color TV signal is inputted from a first input terminal to a first A/D converter where it is converted into a digital signal. The output of the first A/D converter is supplied to a bandpass filter (BPF) 3 where a signal of a narrow bandwidth containing a chrominance signal is picked up. The signal obtained by BPF 3 is supplied to an ACC (Automatic Color Control) circuit 4 which operates to make constant the level of a burst signal contained in the output of BPF 3. The ACC circuit 4 outputs a signal whose chrominance signal has been subjected to correction of a level change caused by the frequency characteristic of a transmission line and accordingly has a constant level. Thereafter, a chrominance signal is demodulated by a first demodulator 5 which is constructed of a very simple circuit. Specifically, a sampling frequency at the A/D converter 2 is selected as 4 $f_{sc}$ (where $f_{sc}$ is a chrominance sub-carrier frequency of an inputted composite color TV signal) and the phase $\theta_1$ of a sampled signal at one of four consecutive sampling points sampled signals is selected as the same as the phase $\theta_0$ of the burst signal. Then, a sampled signal of phase $\theta_1$ becomes a signal $-(B-Y)$, a sampled signal at the next sampling point becomes a signal $(R-Y)$, the next sampled signal becomes a signal $(B-Y)$, and the following sampled signal becomes a signal $-(R-Y)$. Therefore, on condition that signals $-(R-Y)$ and $-(B-Y)$ are inverted in polarity, signals $(R-Y)$ and $(B-Y)$ alternately disposed are produced. Namely, at an output terminal 34 of the first demodulator 5, a demodulated signal appears which is composed of two color-difference signals $(R-Y)$ and $(B-Y)$ multiplexed dot sequentially.

In an NTSC system, since the phase of the chrominance subcarrier is inverted between two consecutive upper and lower lines, the above-described polarity inversion is off-set between adjacent lines. Namely, if a sampled signal at a sampling point on a certain line is a signal $(R-Y)$, then the sampled signal at the same sampling point at the next line is a signal $-(R-Y)$ which becomes $(R-Y)$ when inverted. Therefore, the luminance signal at the same point is also inverted in polarity at the same time.

A signal delayed by 1 H (1 horizontal period) by a first 1 HDL (1 horizontal period delay element: memory) 7 is added to an input signal of the first 1 HDL 7 by an adder 8. In this case if the vertical correlation is high, i.e., if corelation between video signals at two upper and lower lines is high, then a chrominance signal is extracted as an output of the adder, and the luminance signal within the chrominance signal bandwidth is removed.

On the other hand, an input signal to the first 1 HDL 7 is delayed by 1 frame period by a first frame memory 6. This signal delayed by 1 frame period is delayed by 1 horizontal period by a second 1 HDL (1 horizontal period delay element: memory) 9. The output signal of the frame memory 6 and the output signal of 1 HDL 9 are added together by a second adder 10 so that a chrominance signal is extracted as an output of the adder 10 and the luminance signal within the chrominance signal bandwidth is removed.

Since the two chrominance signals with the luminance signals removed therefrom are being delayed by 1 frame period from each other, subtraction between corresponding color-difference signals, e.g., color-difference signals $(R-Y)_1$ and $(R-Y)_2$ is performed at a first subtracter 11. As a result, if the output signal of the first subtracter 11 is zero, there is no chrominance motion of video signals between frames. Otherwise, there is a chrominance motion.

The output signal of the first subtracter 11 has either a positive or negative sign in polarity, so that an absolute value of the signal is obtained by an absolute value conversion circuit 12, the output signal from which is smoothed by a first smoother circuit 13.

The smoother circuit 13 is used for averaging the output signal of the conversion circuit 12 with respect to two color-difference signals $(B-Y)$ and $(R-Y)$. The smoother circuit 13 can readily be realized using a low-pass filter. The output signal of the smoother circuit 13 is a chrominance motion detection signal.

The motion detection signal thus obtained is used for switching the processing of video signals between frames or between fields as described previously. This switching is normally carried out by about 16 steps so that a signal of 4 bits for example is used. Specifically, the mixing ratio of the video signal processed between frames to the video signal processed between fields is switched by 16 steps based on the motion detection signal. Apart from this, a video signal is quantized usually in an 8 bit digital value. In view of this, an 8 bit video signal is non-linearly converted into a 4 bit video signal by a digital level converter 14 having an input-/output characteristic as shown in FIG. 2.

A chrominance motion detection signal thus obtained is mixed, for example, with a motion detection signal of low frequency components of the luminance signal inputted from a second input terminal 16 at a mixer 15. The mixed signal is delayed by 262 H periods by a 262 H (H: horizontal period) delay memory 17, and further delayed by 1 H by a third 1 H memory 18. Since the number of bits for a motion detection signal is being compressed to 4 bits, the memory capacity of the 262 H memory 17 and the third 1 H memory 18 is reduced by half as compared with an ordinary video memory. The motion detection signal for the luminance signal can be obtained from a circuitry shown in FIG. 4 of SMPTE Journal, May 1984, pp. 470 to 476, "A Motion-Adaptive High-Definition Converter for NTSC Color Signals" by M. Achida, K. Ishikura and T. Fukinuki.

The motion detection signals delayed by 262 H periods and 263 H periods are mixed with the current motion detection signal by a mixer 19. The 262 H delay memory 17 and the 1 H memory 18 are employed for using the motion detection signals on scan lines 1 field before, together with the current motion detection signal.

In the mixers 15 and 19, signals may be simply added or the maximum values of signals may be selectively added.

As above, since an unnecessary luminance signal is removed after the chrominance signal is corrected to have a suitable level, it is possible to detect a precise chrominance motion.

In the above embodiment, the chrominance signal is obtained from an A/D converted composite signal so that the BPF circuit and ACC circuit are fabricated using a digital circuit. Since a digital BPF circuit is generally realized by a transversal filter, the scale of circuit likely becomes large. A digital circuit with variable gain is complicated so that an ACC circuit becomes large in scale. Consequently, an A/D converted composite signal may be used as a luminance signal, and a signal separated by an analog BPF and subjected to ACC control may be A/D converted as a chrominance signal.

In such a case, detecting of a chrominance signal is conducted as shown in FIG. 3 just in the same manner as with FIG. 1. In FIG. 3, a composite video signal supplied from an input terminal 1 is converted into a digital signal by an A/D converter 81, after passing through a BPF 21 constructed of a coil L and a capacitor C and an ACC circuit 22 constructed of a linear circuit. The output signal of the A/D converter 81 is quite the same as that of the ACC circuit 4 of FIG. 1. Therefore, the chrominance motion signal outputted from a smoother circuit 13 at an output terminal 23 is quite the same as that outputted from the smoother circuit 13 of FIG. 1. Thus, the functions of the two circuits of FIGS. 1 and 3 become equivalent, connecting a level converter 14 to the output terminal 23 shown in FIG. 3.

Further, as shown in FIG. 4, in case where a BPF circuit 21, ACC circuit 22 and demodulator 24 are constructed of an analog circuit and two color-difference signals (R−Y) and (B−Y) are obtained, the color-difference signals (R−Y) and (B−Y) are A/D converted by A/D converters 27 and 28 and thereafter, multiplexed by a multiplexer 29. When component signals (R−Y) and (B−Y) are inputted to terminals 32 and 33, the two component signals (R−Y) and (B−Y) are selected by switches 25 and 26 and A/D converted by the A/D converters 27 and 28. The A/D converters 27 and 28 can be used conveniently for both cases.

Two color-difference signals (e.g., (R−Y) and (B−Y)) demodulated by the demodulator 24 are inputted to the A/D converters 27 and 28 via the switches 25 and 26, respectively. The two color-difference signals (R−Y) and (B−Y) are converted into digital signals by the two A/D converters 27 and 28 and thereafter, multiplexed in sequence of points by the multiplexer 29. The multiplexed signal is then subjected to the similar processing to that with FIG. 1.

Alternatively, two color-difference signals, i.e., a component (R−Y) signal inputted to the terminal 32 and a component (B−Y) signal inputted to the terminal 33, are supplied to the A/D converters 27 and 28 via the switches 25 and 26 and thereafter, multiplexed by the multiplexer 29. Since the component color-difference signals (R−Y) and (B−Y) do not contain the luminance signal, vertical correlation circuits (comb-type filters) constructed of 1 H memories 7 and 9 and adders 8 and 10 are not needed. Consequently, switches 30 and 31 interlocking the switches 25 and 26, operate to select contacts shown in FIG. 4.

In the above embodiments, a vertical correlation signal between adjacent scan lines for the input signal to the frame memory 6 and for the output signal from the frame memory 6, has been obtained by adding signals on adjacent scan lines using the 1 H memory 7 or 9 and the adder 8 or 10. However, a vertical correlation signal between adjacent scan lines may be obtained after a difference signal between the input and output signals with respect to the frame memory 6 is obtained. In this case, the circuit for detecting a chrominance signal motion can be constructed as shown in FIG. 5.

In FIG. 5, for example, an output signal of the first demodulator 5 shown in FIG. 1 is applied to a terminal 34. The signal delayed by a frame memory 6 is subtracted from the signal applied to the input terminal thereof by a subtracter 11, and the resultant signal is inputted to a correlation circuit constructed of a 1 H memory 7 and an adder 8.

Figure 6:
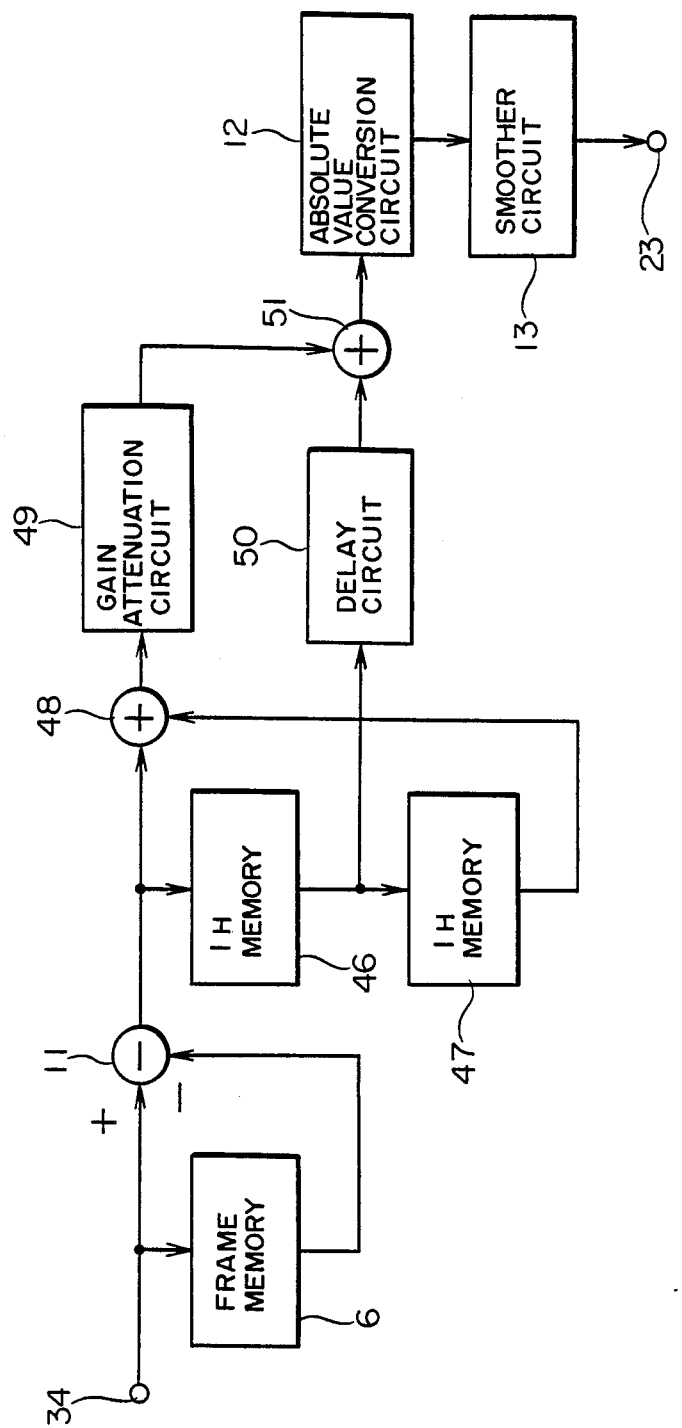
FIG. 6 is a block diagram showing a fifth embodiment of a motion detector according to the present invention.

The vertical correlation circuit (comb-type filter) may use a single 1 H memory or may use two or more 1 H memories. In such a case, a vertical correlation signal can be obtained, as shown in FIG. 6, adding half of the sum of signals on the upper and lower scan lines $l_{n-1}$ and $l_{n+1}$ relative to a center scan line $l_n$, to a signal on the center scan line $l_n$.

The sum of signals on the upper and lower scan lines $l_{n-1}$ and $l_{n+1}$ relative to a selected center scan line $l_n$, is obtained by memories 46 and 47 and an adder 48, the sum being reduced by half by a gain attenuation circuit 49. The output signal of the 1 H memory 46 is delayed by a delay circuit 50 by the amount equal to the delay time Δt produced by the adder 48 and the gain attenuation circuit 49. The output signal of the gain attenuation circuit 49 and the output signal of the delay circuit 50 are added by an adder 51 so that the luminance signal is removed and a chrominance signal is obtained.

Figure 7:
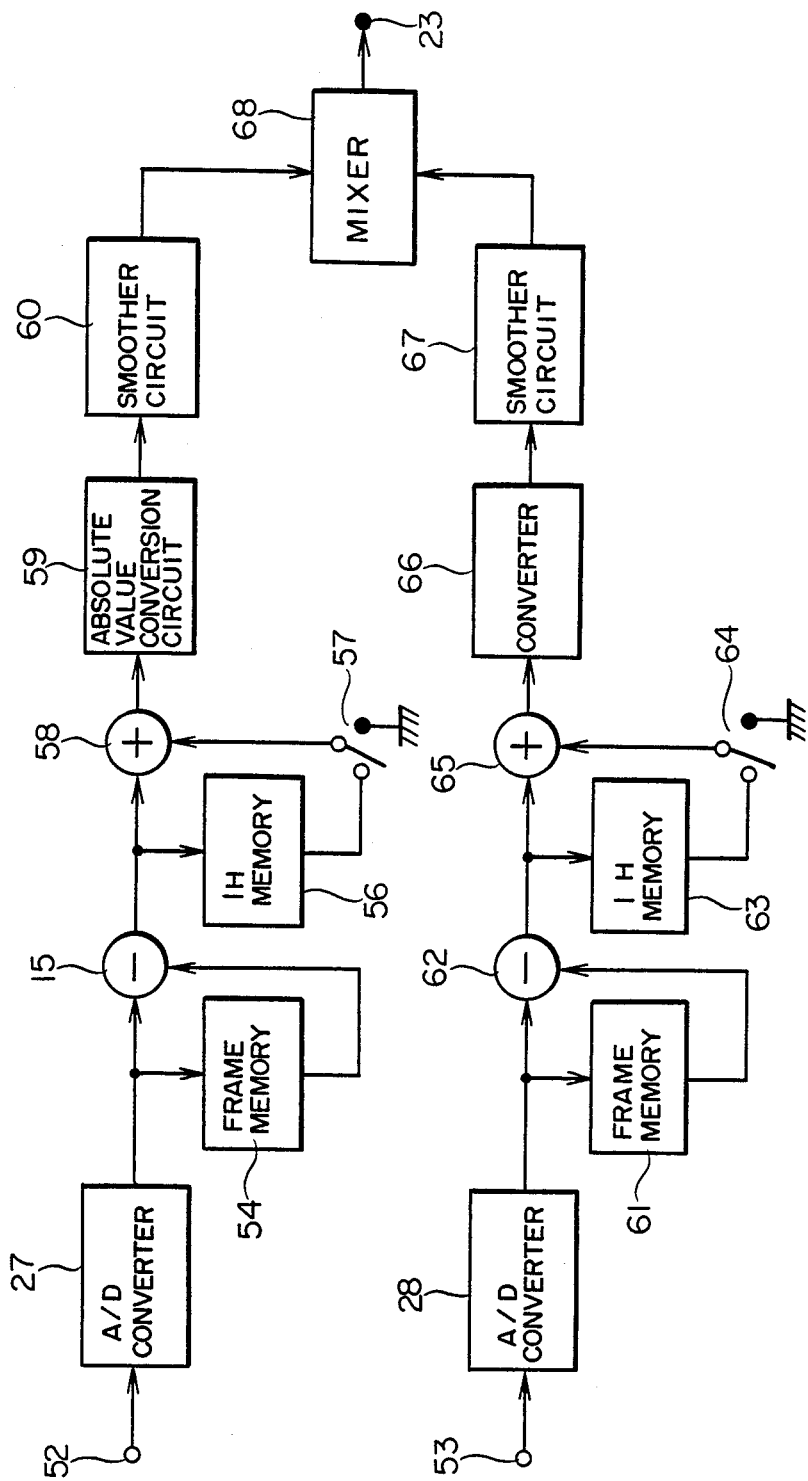
FIG. 7 is a block diagram showing a sixth embodiment of a motion detector according to the present invention.

In the foregoing embodiments, two chrominance signals have been multiplexed dot sequentially. However, a chrominance motion detection signal may be obtained independently for each of the two chrominance signals. An embodiment for this is shown in FIG. 7.

An analog color-difference signal (B−Y) inputted from an input terminal 52 is converted into a digital signal by an A/D converter 27. Then, a difference of video signals between frames is obtained by a frame memory 54 and a subtracter 15 to in turn obtain a vertical correlation signal by a 1 H memory 56 and an adder 58. The absolute value of the vertical correlation signal is obtained by an absolute value conversion circuit 59, and noises are removed by a smoother circuit 60. A color-difference signal (R−Y) is obtained also by quite the same processing using an A/D converter 28, frame memory 61, subtracter 62, 1 H memory 63, adder 65, converter 66 and smoother circuit 67. The chrominance motion detection signal can be obtained at a terminal 23 in quite the same manner as described above, using the smoother circuits 60 and 67 and a mixer 68.

Figure 8:
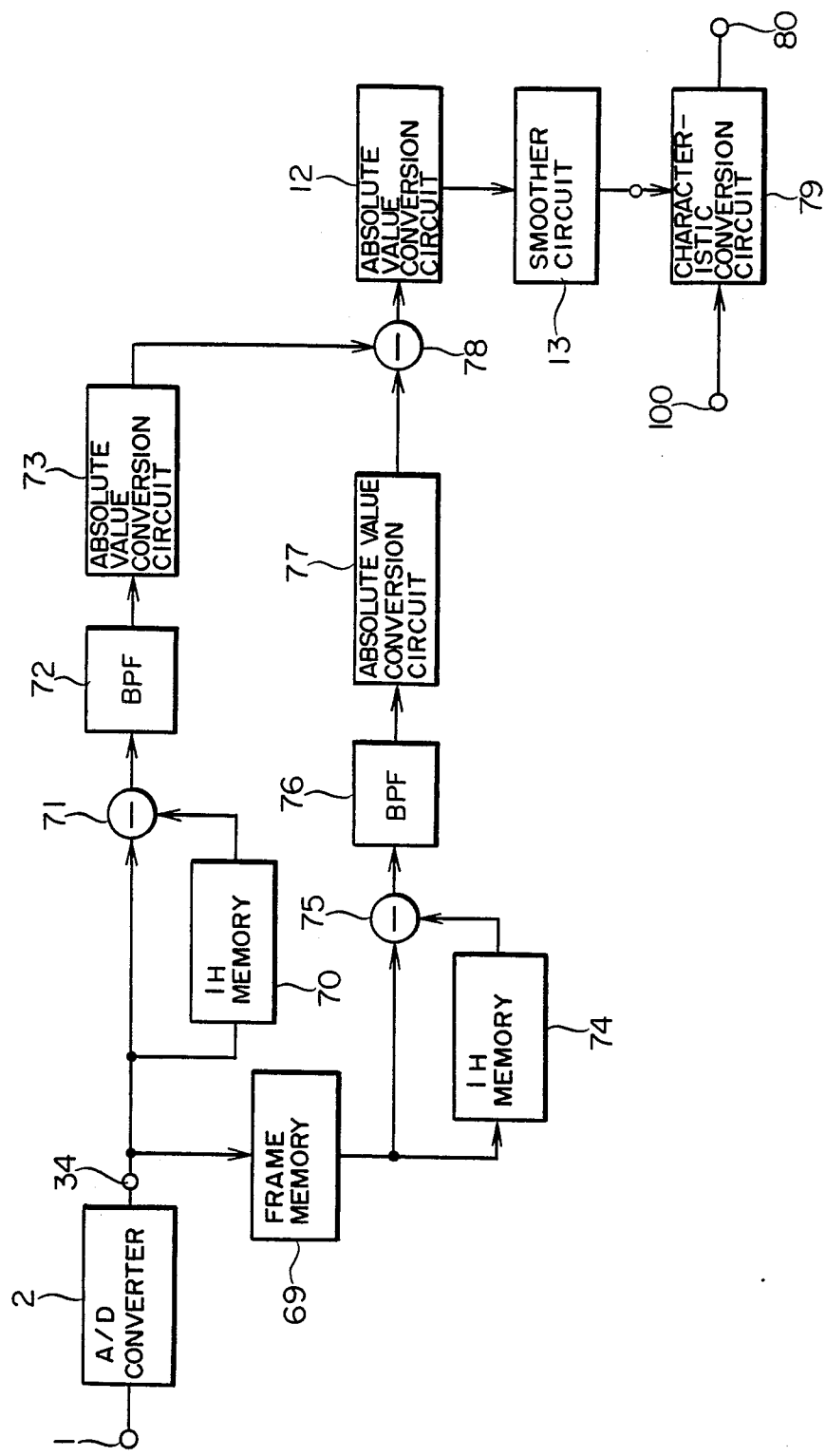
FIG. 8 is a block diagram showing a seventh embodiment of a motion detector according to the present invention.

In the foregoing description, the motion detection signal has been obtained based on a color-difference signal. However, the motion detection signal can obviously be obtained based on a modulated signal. An embodiment for this is shown in FIG. 8.

Figures 9, 10:
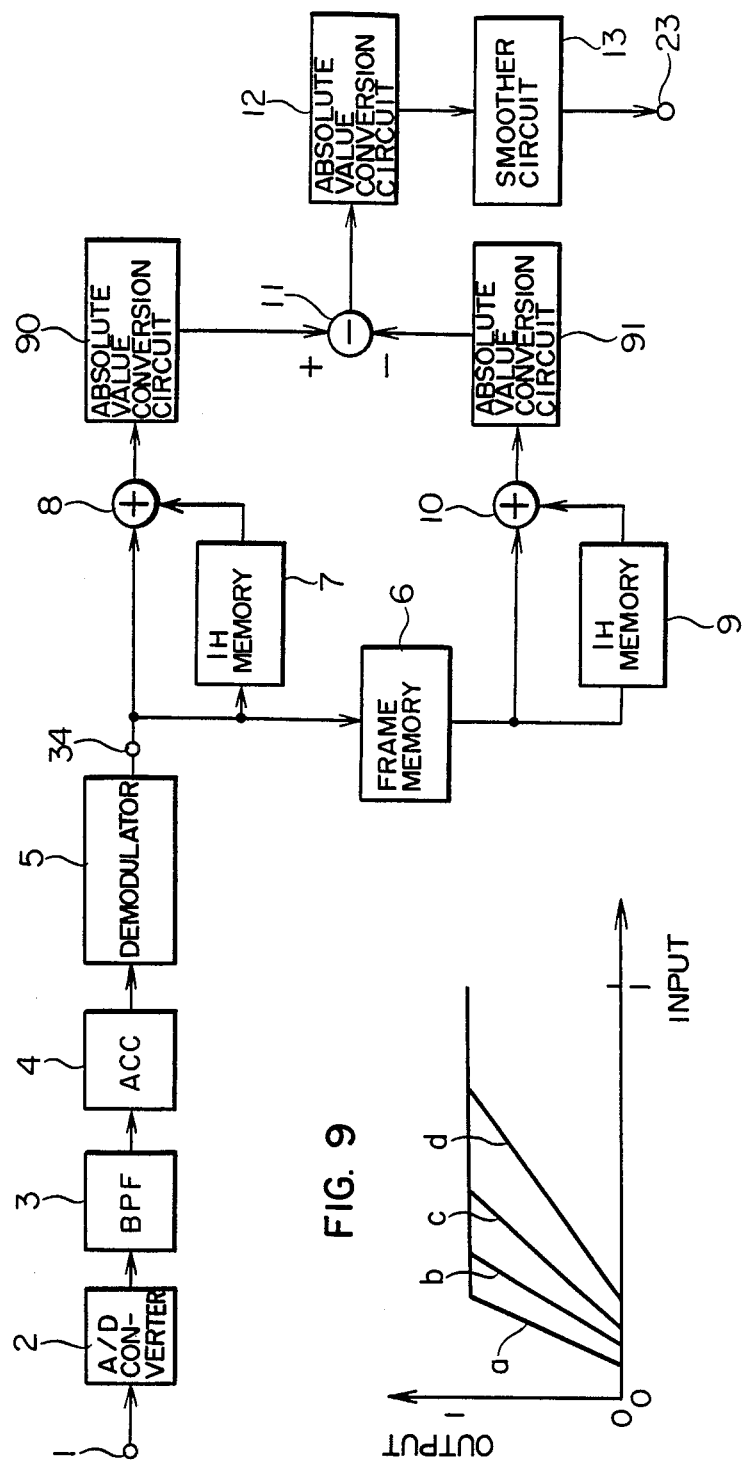
FIG. 9 shows characteristic curves illustrating a performance of a characteristic conversion circuit used in the embodiment of FIG. 8.
FIG. 10 is a block diagram showing an eighth embodiment of a motion detector according to the present invention.

A signal outputted from an A/D converter 2 is delayed by 1 frame period by a frame memory 69. Vertical correlation signals are obtained for respective input and output signals of the frame memory 69, using 1 H memories 70 and 74 and subtracters 71 and 75. Since the signal inputted to an input terminal 1 is a composite signal and since the phases of two chrominance subcarriers on two consecutive lines are inverted in polarity, only the chrominance signals are extracted and the luminance signals are removed by the subtracters 71 and 75 on condition that a vertical correlation is high. The output signals of the subtracters 71 and 75 are respectively inputted to BPF circuits 72 and 76 to eliminate noises. Next, the absolute values of the two chrominance signals are obtained by absolute value conversion circuits 73 and 77 to detect two chrominance signal levels. Thereafter, a difference signal between the two chrominance signal levels is obtained by a subtracter 78. The absolute value of the difference signal is obtained by an absolute value conversion circuit 12 and in turn smoothed by a smoother circuit 13. Consequently, a chrominance signal motion detection signal is detected by the smoother circuit 13. However, since the level of a chrominance signal is generally subjected to change resulting from a transmission line characteristic, the detected chrominance signal motion detection signal includes a level change component caused by the transmission line frequency characteristic, so that the chrominance signal motion detection signal does not necessarily indicate a correct motion amount. In view of this, a characteristic conversion circuit 79 is connected to the smoother circuit 13. The characteristic conversion circuit 79 is designed such that the conversion characteristic of the output signal relative to the input signal can be selected by a signal applied to a terminal 100, as shown in FIG. 9. For instance, a characteristic curve d is selected for the case where the burst signal level is the highest, while a characteristic curve a is selected at the lowest. If the conversion characteristic of the conversion circuit 79 can be changed in accordance with the burst signal level, the ACC circuit is not needed.

An embodiment of an improved version of the circuit of FIG. 1 is shown in FIG. 10. In this circuit, adders 8 and 10 are connected to absolute value conversion circuits 90 and 91.

Correlation of video signals between upper and lower scan lines is low when the video signals contain an image of oblique patterns. As a result, it is difficult to remove the luminance signal completely. The polarities of chrominance signals $C_1$, $C_2$ and luminance signals $Y_1$, $Y_2$ at the same positions between consecutive frames are as shown by (i) and (ii) of FIG. 11. The chrominance signals $C_1$, $C_2$ before demodulation are opposite in polarity, while the luminance signals $Y_1$, $Y_2$ are the same in polarity. After the composite signal having the chrominance signal of negative polarity is demodulated by a demodulator 5, the polarity of the demodulated chrominance signal $C_3$ becomes the same polarity as that of the chrominance signal $C_1$ and the polarity of the demodulated luminance signal $Y_3$ becomes opposite to that of the luminance signal $Y_1$, as shown by (iii) of FIG. 11. If the output signal of the adder 90 is simply subtracted from the output signal of the adder 91 by a subtracter 11, the luminance signals cannot be cancelled out fully.

In view of this, the absolute value signals for the respective output signals of the adders are obtained by the absolute value conversion circuits 90 and 91. As shown by (iv) of FIG. 11, the polarities of the chrominance signal $C_4$ ($C_4 = C_3$) and the luminance signal $Y_4$ ($Y_4 = \overline{Y_3}$) are accordingly directed in the same direction. Therefore, by obtaining a difference signal between the output signals of the two absolute value conversion circuits 90 and 91, the luminance signals for oblique patterns of a still image can be cancelled out.

Since the subtracter 11 produces signals of both positive and negative polarities, an absolute value of the difference signal is obtained by a conversion (absolute value conversion) circuit 14 and in turn smoothed by a smoother circuit 15.

An improved version of the circuit shown in FIG. 3 is shown in FIG. 12. Also in this circuit, absolute value conversion circuits 90 and 91 are connected respectively to adders 8 and 10. With this circuit, the luminance signal can also be removed fully even if the video signal includes oblique pattern images.

Figure 13:
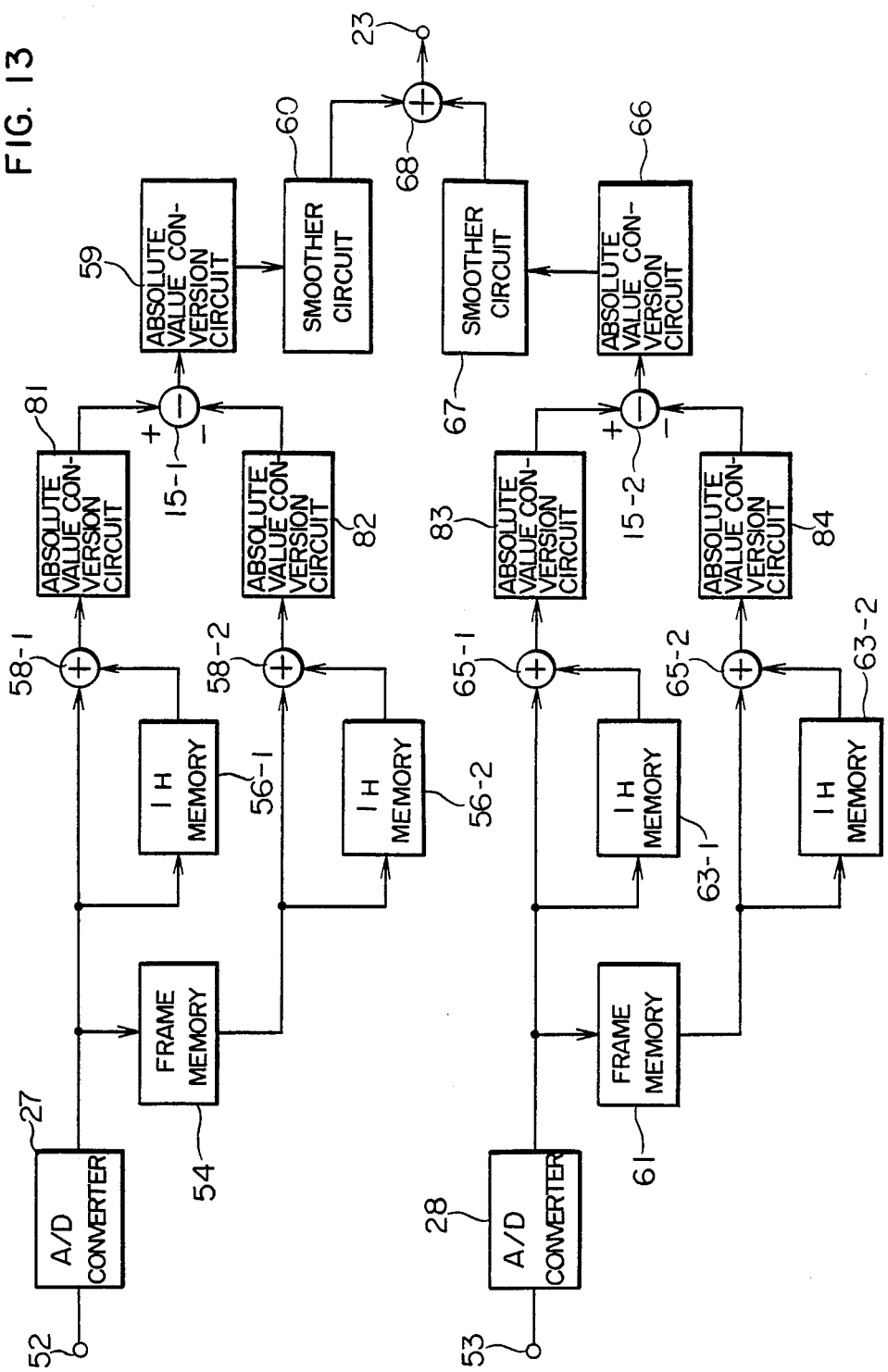
FIG. 13 is a block diagram showing a tenth embodiment of a motion detector according to the present invention.

An embodiment of an improved version of the circuit shown in FIG. 7 is shown in FIG. 13. In this circuit, 1 H memories 56-1, 56-2, 63-1, 63-2 and adders 58-1, 58-2, 65-1, 65-2 are independently provided, and absolute value conversion circuits 81, 83, 84 are respectively connected to the adders 58-1, 58-2, 65-1, 65-2. With this circuit, the luminance signal can also be removed fully even if the video signal includes oblique pattern images.

Figure 14:
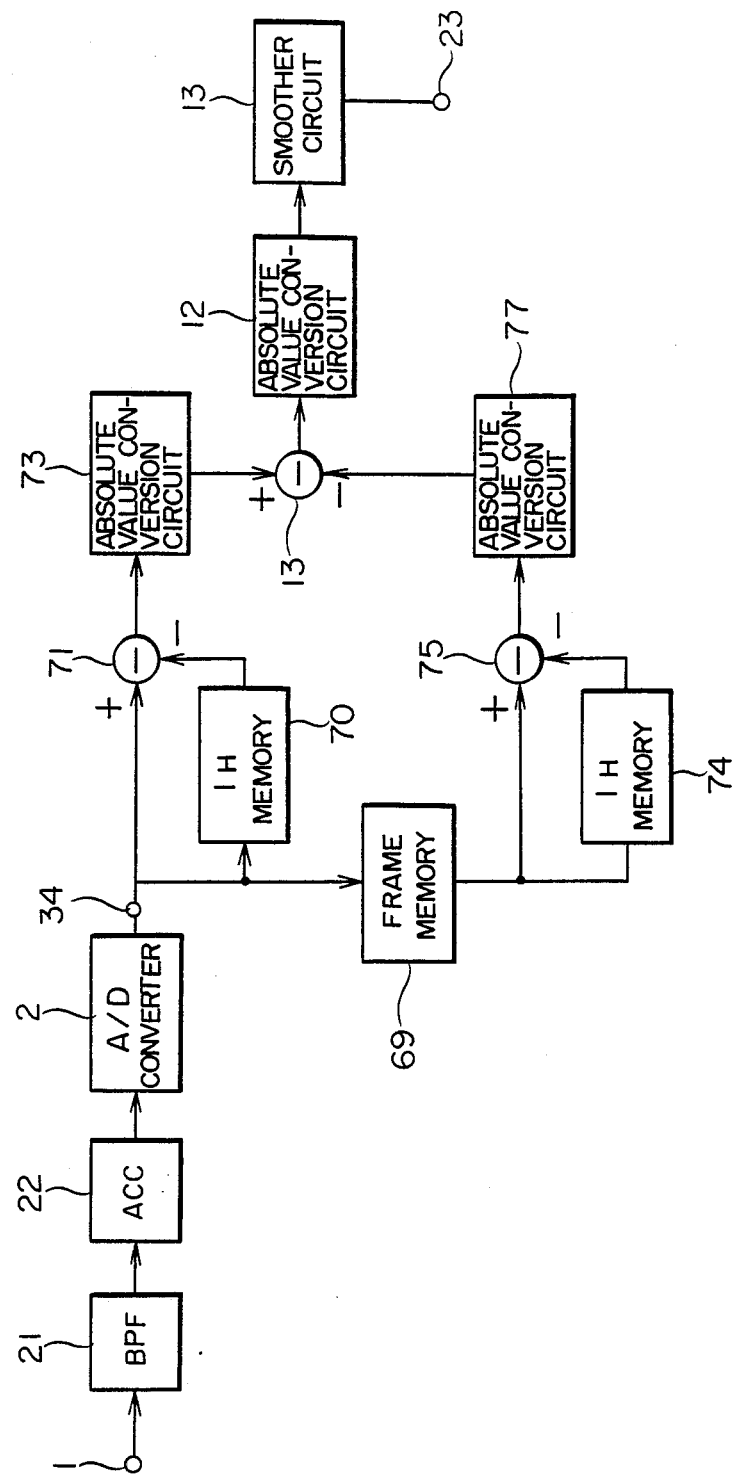
FIG. 14 is a block diagram showing an eleventh embodiment of a motion detector according to the present invention.

An improved version of the circuit shown in FIG. 8 is shown in FIG. 14. In this circuit, BPF 21 and ACC circuit 22 are connected to the preceding stage of an A/D converter 2. Since the ACC circuit 22 is used, the characteristic conversion circuit shown in FIG. 8 is not needed. With this circuit of FIG. 14, a chrominance signal motion detection signal can be obtained from a modulated chrominance signal at a terminal 23.

In the foregoing embodiments, the luminance signal has been removed by a comb-type filter using a correlation of video signals between two consecutive scan lines. If a comb-type filter using a correlation of video signals between two consecutive fields, is used, a correlation of video signals between scan lines positioning nearer to each other in the direction vertical to lusters can be detected. Therefore, the luminance signal can be removed more reliably. The comb-type filter applicable to such a case is shown in FIG. 15.

Figure 16:
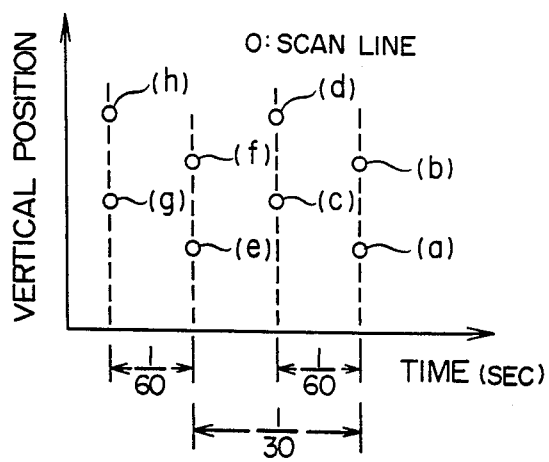
FIG. 16 diagrammatically shows the positions of scan lines of video signals on two consecutive frames.

An input terminal 126 is connected to the output terminal of the demodulator 5 shown in FIG. 10 or 12. Assuming that the position of scan line of an input signal to the input terminal 126 is at position (a) of FIG. 16, then the scan line positions of output signals (b), (c), (d), (e), (f), (g) of corresponding 1 H memories 127, 129, 131, 133, 262 H memories 128, 132, and 262 memory 130, are those positions (b) to (g) of FIG. 16, respectively. Specifically, since the output signal (e) of the 261 memory 130 is 525 H periods before the input signal (a) supplied to the input terminal 126, the position (e) of the signal (e) is the same position 1/30 sec before the position (a). The input and output signals of the 1 H memory 127 are inputted to an adder 134, while the input and output signals of the 1 H memory 129 are inputted to an adder 135. Thus, video signals on four scan lines of the two consecutive fields are added together by an adder 138. In this case, as to the phase of a chrominance subcarrier, the phases of the signals (b) and (c) as well as those of the singlas (a) and (d) are the same, while the phases of the signals (b) and (c) as well as those of the signals (a) and (d) are different. Since the phases of the signals (a) and (c) are different, addition of the signals (a) and (c) is performed for those signals on scan lines nearer to each other in the vertical direction than those signals (a) and (b). Consequently, the luminance signal can be removed more efficiently than the case using a line comb-type filter for signals on consecutive scan lines. For addition of the signals (b) and (d), a similar comb-type filter is formed. Further, the luminance signals for the two comb-type filters are opposite in polarity when a vertical correlation is high, so that a further removal of the luminance signals is possible by the two comb-type filters.

Similarly, an adder 139 adds together the signals (e) to (g) on four scan lines. The output signals of the adders 138 and 139 have a time difference of just one frame period as seen from FIG. 16. The absolute value signals of the two output signals are obtained by absolute value conversion circuits 90 and 91, and a difference signal of the absolute value signals is obtained by a subtracter 11, with the output terminal 40 thereof being connected to the absolute value conversion circuit 12 of FIG. 10. Consequently, a chrominance signal motion detection signal is obtained at the output terminal 23 of FIG. 10 circuit.

Figure 15:
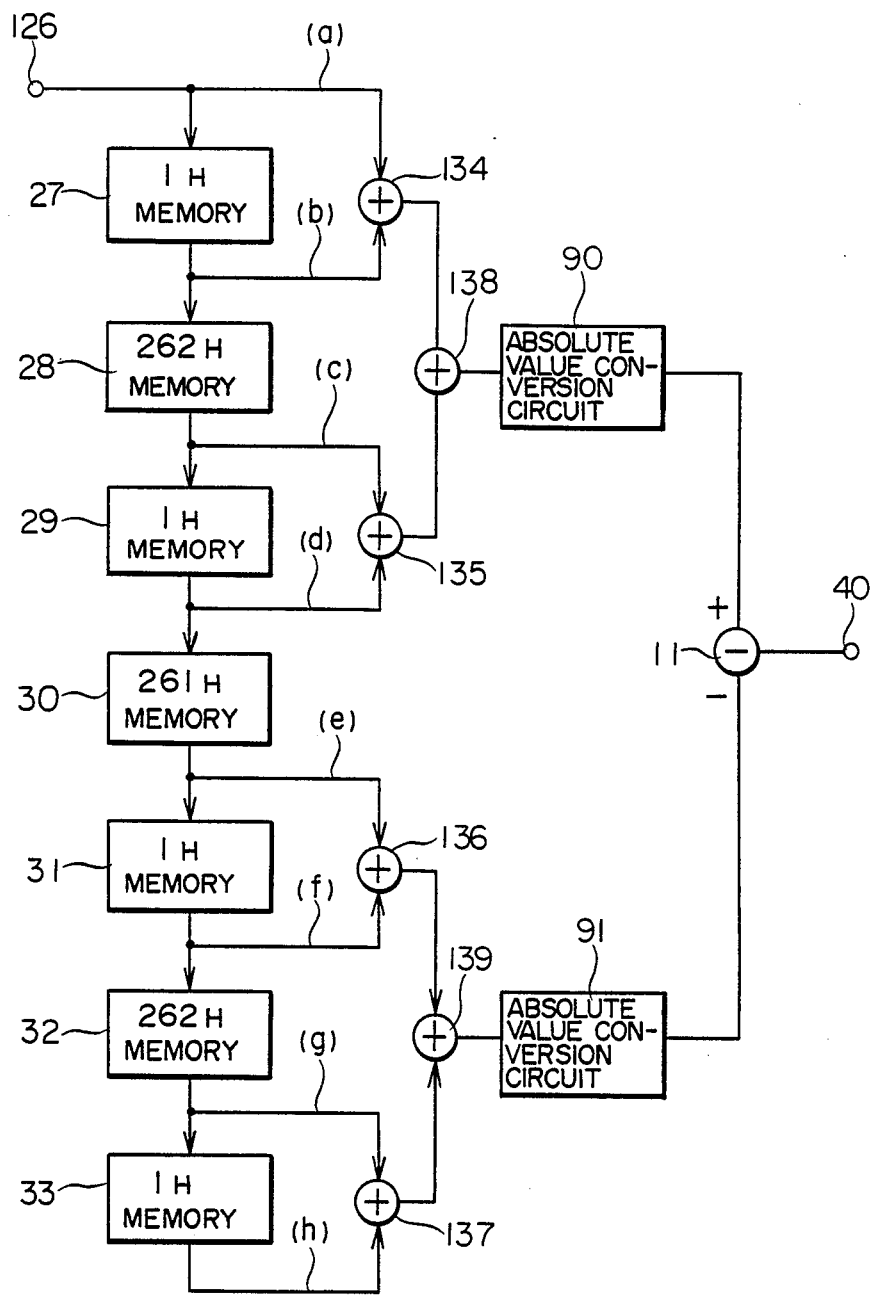
FIG. 15 is a block diagram showing a twelfth embodiment of a motion detector according to the present invention.
Figure 17:
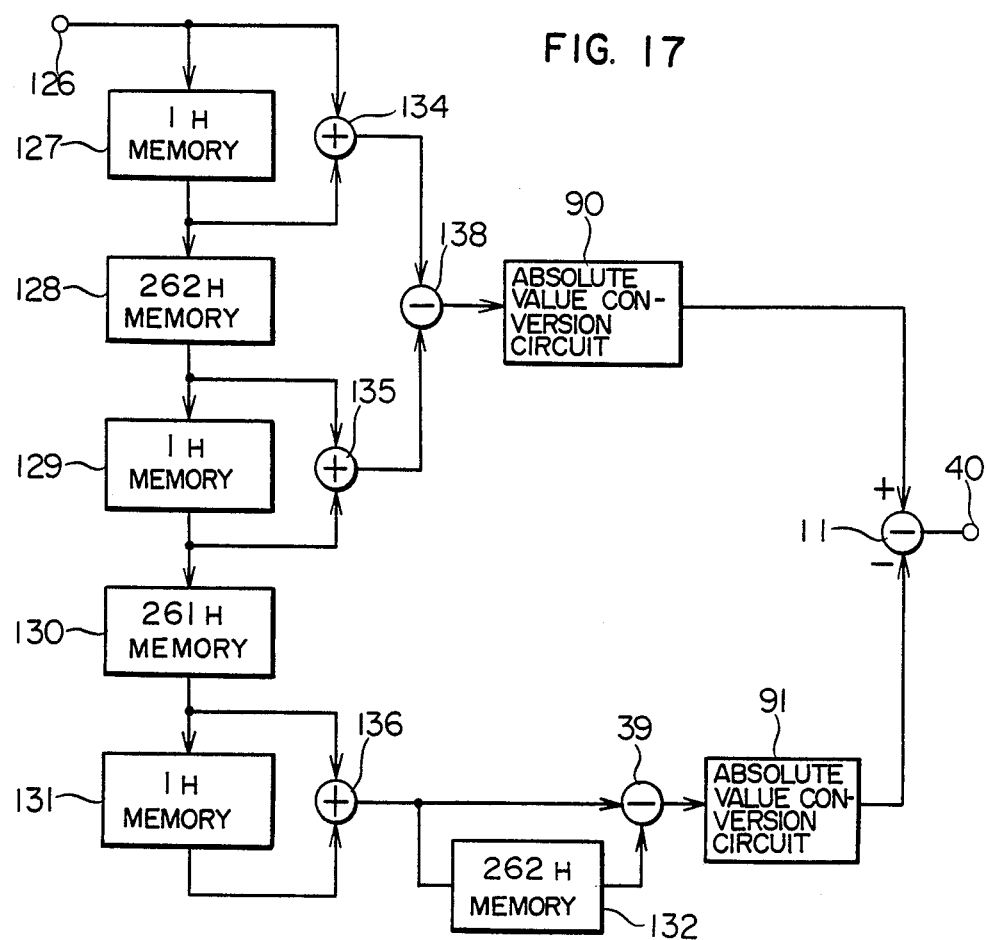
FIG. 17 is a block diagram showing a thirteenth embodiment of a motion detector according to the present invention.

In this comb-type filter of FIG. 15, a memory capable of storing signals corresponding to approximately three fields, is used. For a comb-type filter using two frames, a memory capable of storing signals corresponding to one frame suffices. Therefore, as shown in the circuit of FIG. 17, if an output signal of an adder 136 is inputted to a 262 H memory 132, the 1 H memory 133 and the adder 137 can be omitted.

We claim:

1. A motion detector for a chrominance signal for use with a TV receiver for detecting a motion of a chrominance signal contained in a video signal and generating a chrominance signal motion detection signal, comprising:
   a first input terminal adapted to be supplied with a digitalized video signal containing a luminance signal and a chrominance signal;
   a frame memory connected to said first input terminal and supplied with said digitalized video signal from said first input terminal, for delaying said video signal by one frame period and generating a delayed video signal;
   a first comb-type filter including a first 1 horizontal period delay element and a first adder, connected to said first input terminal, and supplied with said digitalized video signal from said first input terminal, for removing a luminance signal contained in said digitalized video signal and selecting a first chrominance signal;
   a second comb-type filter including a second 1 horizontal period delay element and a second adder, connected to said frame memory, and supplied with said delayed video signal from said frame memory, for removing a luminance signal contained in said delayed video signal therefrom and generating a second chrominance signal;
   a subtracter connected to said first comb-type filter and said second comb-type filter, supplied with said first chrominance signal from said first comb-type filter and said second chrominance signal from said second comb-type filter, for generating a difference signal between said first and second chrominance signals;
   a first absolute value conversion circuit connected to said subtracter and supplied with said difference signal from said subtracter, for generating an absolute value difference signal; and
   a smoother circuit connected to said first absolute value conversion circuit and supplied with said absolute value difference signal from said first absolute value conversion circuit, for smoothing a digital difference signal and generating said smoothed difference signal as a chrominance signal motion detection signal.

2. A motion detector for a chrominance signal according to claim 1 further comprising:
   a digital level converter connected to said smoother circuit and having a non-linear characteristic, for limiting said smoothed difference signal to reduce the number of bits of said smoothed difference signal;
   a second input terminal adapted to be supplied with a luminance signal motion detection signal;
   a first mixer connected to said level converter and said second input terminal, supplied with said limited difference signal from said level converter and said luminance signal motion detection signal from said second input terminal, for mixing said limited difference signal with said luminance signal motion detection circuit and generating a first mixed motion detection signal containing said luminance signal motion detection signal and said chrominance signal motion detection signal;
   a field memory connected to said first mixer, and including a 262 horizontal period delay memory and a third 1 horizontal period delay element serially connected to said 262 horizontal period delay memory, said first mixed motion detection signal being supplied from said first mixer to said 262 horizontal period delay memory; and
   a second mixer connected to said 262 horizontal period delay memory and said third 1 horizontal period delay element respectively of said field memory, for mixing the output signals of said first mixer, said 262 horizontal period delay memory and said third 1 horizontal period delay element and generating a second mixed motion detection signal.

3. A motion detector for a chrominance signal according to claim 1 further comprising:
   a second absolute value conversion circuit connected between said first comb-type filter and said subtracter and supplied with said first chrominance signal from said first comb-type filter, for obtaining the absolute value of said first chrominance signal and supplying said absolute value of said first chrominance signal to said subtracter circuit; and
   a third absolute value conversion circuit connected between said second comb-type filter and said subtracter and supplied with said second chrominance signal from said second comb-type filter, for obtaining the absolute value of said second chrominance signal and supplying said absolute value of said second chrominance signal to said subtracter circuit.

4. A motion detector for a chrominance signal according to claim 1 further comprising:
   a third input terminal adapted to be supplied with an analog video signal containing a luminance signal and a modulated chrominance signal;
   an analog/digital converter connected to said third input terminal for converting said analog video signal to a digital video signal;
   a band-pass filter connected to said analog/digital converter for selecting and passing a video signal within a frequency bandwidth containing said chrominance signal;
   an automatic color control circuit connected to said band-pass filter and supplied with said video signal selected by said band-pass filter, for controlling the level of said selected video signal; and
   a demodulator connected said automatic color control circuit and said first input terminal, for demodulating said modulated chrominance signal contained in said digital video signal supplied from said automatic color control circuit and supplying said demodulated chrominance signal and said luminance signal contained in said digital video signal to said first input terminal.

5. A motion detector for a chrominance signal according to claim 1 further comprising:
a third input terminal adapted to be supplied with an analog video signal containing a luminance signal and a modulated chrominance signal;
a band-pass filter connected to said third input terminal for selecting and passing a video signal within a frequency bandwidth containing said chrominance signal;
an automatic color control circuit connected to said band-pass filter and supplied with said video signal selected by said band-pass filter, for controlling the level of said selected video signal;
an analog/digital converter connected to said automatic color control circuit for converting said level-controlled video signal into a digital video signal; and
a demodulator connected to said analog/digital converter and said first input terminal, for demodulating said modulated chrominance signal contained in said digital video signal supplied from said analog/digital converter and supplying said demodulated chrominance signal and said luminance signal contained in said digital video signal to said first input terminal.

6. A motion detector for a chrominance signal according to claim 3 further comprising:
a digital level converter connected to said smoother circuit and having a non-linear characteristic, for limiting said smoothed difference signal to reduce the number of bits of said smoothed difference signal;
a second input terminal adapted to be supplied with a luminance signal motion detection signal;
a first mixer connected to said level converter and said second input terminal, supplied with said limited difference signal from said level converter and said luminance signal motion detection signal from said second input terminal, for mixing said limited difference signal with said luminance signal motion detection circuit and generating a first mixed motion detection signal containing said luminance signal motion detection signal and said chrominance signal motion detection signal;
a field memory connected to said first mixer, and including a 262 horizontal period delay memory and a third 1 horizontal period delay element serially connected to said 262 horizontal period delay memory, said first mixed motion detection signal being supplied from said first mixer to said 262 horizontal period delay memory; and
a second mixer connected to said 262 horizontal period delay memory and said third 1 horizontal period delay element respectively of said field memory, for mixing the output signals of said first mixer, said 262 horizontal period delay memory and said third 1 horizontal period delay element and generating a second mixed motion detection signal.

7. A motion detector for a chrominance signal according to claim 6 further comprising:
a third input terminal adapted to be supplied with an analog video signal containing a luminance signal and a modulated chrominance signal;
an analog/digital converter connected to said third input terminal for converting said analog video signal to a digital video signal;
a bandpass filter connected to said analog/digital converter for selecting and passing a video signal within a frequency bandwidth containing said chrominance signal;
an automatic color control circuit connected to said bandpass filter and supplied with said video signal selected by said bandpass filter, for controlling the level of said selected video signal; and
a demodulator connected said automatic color control circuit and said first input terminal, for demodulating said modulated chrominance signal contained in said digital video signal supplied from said automatic color control circuit and supplying said demodulated chrominance signal and said luminance signal contained in said digital video signal to said first input terminal.

8. A motion detector for a chrominance signal according to claim 6 further comprising:
a third input terminal adapted to be supplied with an analog video signal containing a luminance signal and modulated chrominance signal;
a bandpass filter connected to said third input terminal for selecting and passing a video signal within a frequency bandwidth containing said chrominance signal;
an automatic color control circuit connected to said bandpass filter and supplied with said video signal selected by said bandpass filter, for controlling the level of said selected video signal;
an analog/digital converter connected to said automatic color control circuit for converting said level-controlled video signal into a digital video signal; and
a demodulator connected to said analog/digital converter and said first input terminal, for demodulating said modulated chrominance signal contained in said digital video signal supplied from said analog/digital converter and supplying said demodulated chrominance signal and said luminance signal contained in said digital video signal to said first input terminal.

9. A motion detector for a chrominance signal according to claim 2 further comprising:
a third input terminal adapted to be supplied with an analog video signal containing a luminance signal and a modulated chrominance signal;
an analog/digital converter connected to said third input terminal for converting said analog video signal to a digital video signal;
a bandpass filter connected to said analog/digital converter for selecting and passing a video signal within a frequency bandwidth containing said chrominance signal;
an automatic color control circuit connected to said bandpass filter and supplied with said video signal selected by said bandpass filter, for controlling the level of said selected video signal; and
a demodulator connected said automatic color control circuit and said first input terminal, for demodulating said modulated chrominance signal contained in said digital video signal supplied from said automatic color control circuit and supplying said demodulated chrominance signal and said luminance signal contained in said digital video signal to said first input terminal.

10. A motion detector for a chrominance signal according to claim 2 further comprising:

a third input terminal adapted to be supplied with an analog video signal containing a luminance signal and modulated chrominance signal;

a bandpass filter connected to said third input terminal for selecting and passing a video signal within a frequency bandwidth containing said chrominance signal;

an automatic color control circuit connected to said bandpass filter and supplied with said video signal selected by said bandpass filter, for controlling the level of said selected video signal;

an analog/digital converter connected to said automatic color control circuit for converting said level-controlled video signal into a digital video signal; and a demodulator connected to said analog/digital converter and said first input terminal, for demodulating said modulated chrominance signal contained in said digital video signal supplied from said analog/digital converter and supplying said demodulated chrominance signal and said luminance signal contained in said digital video signal to said first input terminal.

* * * * *